June 11, 1968 K. N. HASENBANK 3,387,346

BAG CLAMP

Filed March 28, 1966

INVENTOR.
KENNETH N. HASENBANK
BY
Thomas H. Lennon

United States Patent Office 3,387,346
Patented June 11, 1968

3,387,346
BAG CLAMP
Kenneth N. Hasenbank, Minneapolis, Minn., assignor to Toro Manufacturing Corporation, Minneapolis, Minn., a corporation of Minnesota
Filed Mar. 28, 1966, Ser. No. 537,960
6 Claims. (Cl. 24—270)

ABSTRACT OF THE DISCLOSURE

A bag clamp attached to the mouth of a bag for clamping same on a tube or similar support. The clamp is an annular member comprising three sections hingedly linked together in end-to-end relationship which provide a toggle type, over-center locking action to hold the clamp in contracted formation, the bag assuming the shape of the clamp in both expanded and contracted formations.

This invention relates to a novel clamp which is especially useful for clamping the mouth of a bag or similar object to a tube, and finds particular applicability in clamping grass clipping collecting bags to the discharge chutes of conventional rotary mowers, although the scope of the invention is not necessarily limited to such use.

Many rotary mowers provide for discharge of the clippings from the cutter blade housing through a suitable opening provided therein. It has become common practice to collect these clippings in a bag which is attached directly to a tubular conduit which is either permanently or detachably mounted on the mower in communication with the discharge opening of the mower housing to convey the clippings to, and guide them into, the bag. Patent No. 2,973,614 illustrates an example of the type of rotary mower and bagging attachment therefor with which we are here concerned. These bags usually must be removed from the conduit and emptied several times during a single mowing operation, are usually emptied through the neck portion of the bag attached to said conduit, and are usually removed, emptied, and remounted while the mower continues to run, thereby stressing the need for a safe and convenient means of attaching the bag to the conduit.

To date, various means have been employed to secure the bag to the conduit, such as draw strings, clips, screw fasteners, wire, zippers, etc., none of which have met all of the desired requirements. Such securing means are preferably safe, inexpensive, simple, easy and quick to operate, and should not clog and malfunction when exposed to the clippings. The conventional securing means either wear out quickly, clog up and malfunction, are difficult or awkward to operate, or require the operator when operating same to assume a dangerous position close to the mower for a period of time, and possibly requiring shifting of position while close to the mower, where there is a possibility that the hands or feet of the operator will be endangered by the rotating cutting blade. Other of the conventional securing means utilize several detachable component parts, some of which may be lost or misplaced. Still others do not form a part of the bag itself, or if forming a part thereof, do not function to shape the mouth to facilitate its mounting on the conduit.

The clamp of the present invention meets all of the aforementioned requirements, and obviates the problems of conventional bag clamping devices. It constitutes a unitary device which is safe and relatively inexpensive, can be built into the hem of the bag to shape same to facilitate mounting thereof, and to avoid misplacement of the clamp, is clog and malfunction proof, and is exceedingly simple and easy to operate in a single action with a minimum of effort, and securely clamps the bag to the conduit so that there is little likelihood of disengagement therefrom during use.

These and other objects and advantages will be apparent from the following description made in connection with the accompanying drawings wherein.

Figure 1:
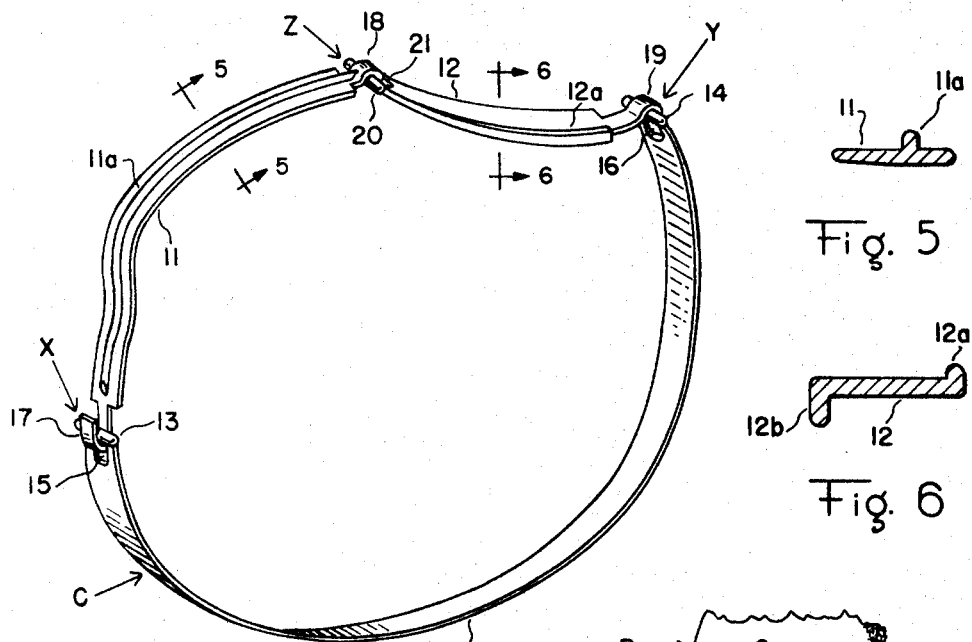
FIGURE 1 is a perspective view of a completely open clamp constituting one preferred embodiment of this invention.
Figure 5:
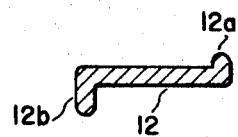
FIGURE 5 is a cross-sectional view taken on the line 5—5 of FIGURE 1.
Figure 6:
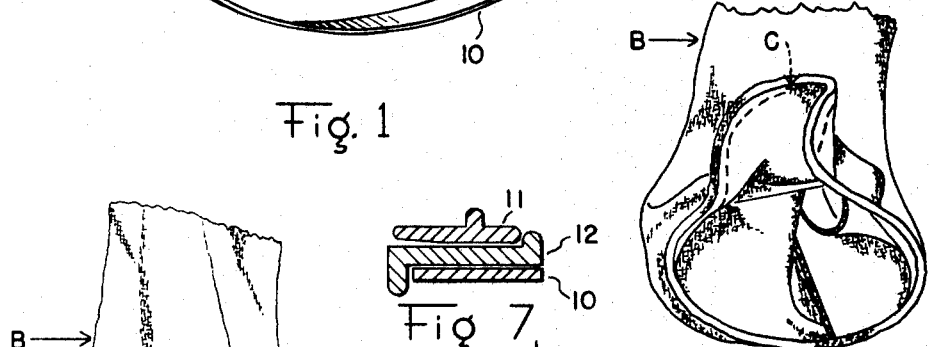
FIGURE 6 is a cross-sectional view taken on the line 6—6 of FIGURE 1.

Referring to the drawings, a bag B formed of suitable flexible material is shown having the clamp C of this invention sewn into the hem around the mouth of the bag so as to define and shape same, said bag being attachable to any tubular conduit such as T by means of said clamp. The tube and bag may be attachable to a rotary mower for collectings, as aforementioned, or may be coupled together for any other suitable purpose.

The clamp C includes three elongate sections or links 10, 11, and 12 respectively which are successively hingedly linked together in end-to-end relationship for relative articulation therebetween for opening and closing the clamp.

Link 10 is an elongate resilient flexible curved strap which, when the clamp is closed, preferably encloses more than half of the tube T. This strap is sufficiently flexible to enable it to be repeatedly opened and closed and shaped to the approximate curvature of the tube when the clamp is closed and to enable the ends thereof to be moved apart sufficiently and the strap opened sufficiently to enable it, and the bag to which it is attached, to be conveniently mounted and dismounted on the tube.

The extreme outer ends of strap 10 are provided with similar hinge or pivot pins 13 and 14 which are oriented transversely of the length of the strap. Similar slots 15 and 16 are formed in the outer end portions of strap 10 adjacent their respective pins 13 and 14 to receive the other half of each of the respective hinge assemblies for strap 10.

Link 11 is an elongate generally outwardly curved or convexed member which is provided with an outer longitudinal reinforcing rib 11a, and reduced outer end portions 17 and 18 which are looped or bent in opposite directions to form hooks or eyes which form part of the hinge assembly for each end of link 11. Hook 17 is bent outwardly and inserted in slot 15 so as to receive hinge pin 13 and form a hinge assembly X therewith for pivotally connecting links 10 and 11.

Link 12 is an elongate arcuate member having elongate longitudinal ribs or flanges 12a and 12b formed therefrom and extending in opposite directions from opposite sides thereof.

One end of link 12 has a reduced portion 19 which is bent or looped inwardly to form a hook or eye which receives pin 14 and is received by slot 16 to form a hinge connector Z between links 10 and 12.

The other end of link 12 is provided with a transversely oriented hinge or pivot pin 20 which is engaged by the inwardly bent hook 18 of link 11 to form a hinge connection V between links 11 and 12, link 12 having a slot 21 formed therein adjacent pin 20 to accommodate loop 18.

Hooks 17, 18, and 19 are detachable from their respective hinge pins for convenient disconnection of the links from each other and breakdown of the clamp when desired.

The clamp is preferably sewn into the bag itself by means of a hem portion 22 and stitching 23 which retains the clamp in position relative to the bag.

Figures 2, 3, 4, 7, 8:
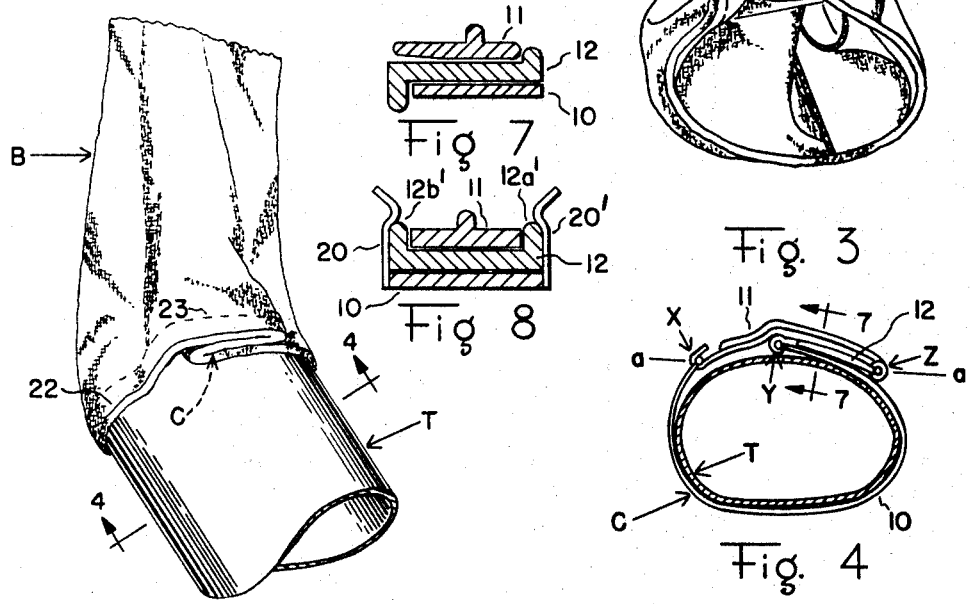
FIGURE 2 is a perspective view of a portion of a bag provided with the clamp of FIGURE 1 clamped to a tube.
FIGURE 3 is a front elevational view of the bag of FIGURE 2 with the clamp in unlocked partially open condition.
FIGURE 4 is a cross-sectional view taken approximately on the line 4—4 of FIGURE 2, with the bag stripped from the clamp.
FIGURE 7 is a cross-sectional view taken on the line 7—7 of FIGURE 4.
FIGURE 8 is a cross-sectional view similar to FIGURE 7 showing an alternate form of clamp of this invention.

The clamp is designed to provide an over-center locking action when the clamp is closed, as in FIGURE 4. In such condition, the axis of hinge Y is above or outward of a straight line a—a extending between the axes of hinges X and Z. When locked, hinge Y is received by the inner central concave portion of link 11, link 12 overlies strap 10, and one end portion of link 11 overlies link 10, so that link 12 is sandwiched between links 10 and 11. In such condition, rib 12a is contiguous with and opposite one side of link 11, and rib 12b is contiguous with and opposed to the opposite side of strap 10, whereby link 12 is held against significant lateral shifting movement relative to links 10 and 11 by said ribs.

The clamp is easily unlocked by simply grasping hinge Z of the sides of locking links 11 and 12 and pulling upwardly thereon with a slight lifting force until the axis of hinge Y is below or inward of the centerline between the axes of hinges X and Z. This upward movement also causes a simultaneous spreading apart of the ends of strap 10 and an enlargement of the opening defined thereby and by the bag so that the clamp can be readily removed from the tube.

When the clamp is open and unstressed, such as shown in FIGURE 3, all that is necessary to lock the clamp is to grasp locking links 11 and 12 between the fingers on opposite sides of hinge Z and squeeze them towards one another and simultaneously push downward thereon until the aforedescribed over-center locking action is accomplished and the clamp components assume the respective positions of FIGURE 4. This downward movement causes the ends of strap 10 to be simultaneously drawn towards one another to contract the strap and securely clamp the strap and bag to the tube. Thus, in a single action, the clamp can be quickly and easily opened and closed.

Thus, it can be seen that the clamp of this invention is a deformable annular member capable of assuming expanded and contracted formations of different cross-sectional size, with portions of the member coacting to effect said expansion and contraction and provide an over-center locking action to retain the member in contracted clamping condition. More specifically, the locking links 11 and 12 functionally cooperate with each other and with strap 10 to expand and contract said strap and lock same in clamped condition.

Although the clamp of this invention is particularly adaptable for use with a bagging attachment for a rotary mower in the manner hereinbefore described, and such use comes within the novel and inventive aspects and scope of this invention, it has been deemed unnecessary to provide an illustration of a rotary mower, since they are notoriously well known. Furthermore, reference to the aforementioned patent should resolve any doubts as to the type of mower and bagging attachment to which this invention relates.

Although the clamp may be made of any suitable material, it has been found desirable to make same entirely of plastic. In one preferred embodiment, the strap 10 is formed of polyethylene and the locking links 11 and 12 are formed of polypropylene, with the locking links being rigid in contrast to the flexible character of the clamping strap, said locking links being sufficiently rigid that they will not undergo any significant deformation under normal usage.

When the clamp is closed the strap 10 is tensioned by the drawing together of the ends thereof, and this tension biases the hinge Y outwardly towards and against link 11 when Y moves outwardly of the centerline between X and Z, thereby providing the positive locking action desired, and assisting in moving the component parts to their final locked positions as shown in FIGURE 4 once Y has passed outwardly of said centerline. This tension also assists in opening the clamp and spreading the strap once the locking links have been pulled outwardly far enough to position hinge Y inwardly of said centerline. The concavity provided by link 11 is designed to provide enough room for hinge Y so that it can be properly located outwardly of said centerline in a positive locking position.

When applied to a bagging attachment for a mower, the clamp is preferably embodied entirely within, and covered by, the bag fabric, as illustrated. This arrangement protects and shields the clamp from the clippings to avoid any possibility of clogging and malfunctioning, and causes the bag mouth to be shaped by, and assume the shape of the clamp. Thus, the unlocked clamp holds the bag mouth in an enlarged open shape which facilitates emptying of the bag and mounting and dismounting thereof on the tube. It will be understood, however, that it is within the scope of this invention to utilize means other than the one illustrated for attaching the clamp to a bag. Thus, the clamp could be fastened to the bag as by staples or other suitable fastening means, and can be partially or totally exposed within the scope hereof.

Link 12 is slightly wider than strap 10. This facilitates grasping and manipulation of the locking links when unlocking the clamp. Ribs 12a and 12b, in addition to limiting lateral movement when locked, serve as strengthening means for link 12. The curvature of links 11 and 12 is such as to enable them to substantially conform with each other, strap 10 and the curvature of the tube when locked. The hinge hooks are so designed that they will not become unintentionally disengaged from their respective hinge pins during use, this being accomplished by said hooks encompassing more than half the circumference of the hinge pins. However, there is sufficient resilience in the hooks so that they can be opened enough to permit disengagement from the pins.

FIGURE 8 illustrates an alternate form of clamp of this invention utilizing releasable mechanical means for engaging the handle portion of the clamp represented by the locking links and positively holding same in locked position. In this alternate form, the clamp is the same as previously described, except that link 12 is replaced by link 12' which is similar to 12, except that flange or rib 12b is reversed and replaced by rib 12b' so that both the reinforcing and guide ribs extend in the same direction, namely upwardly. In addition, a pair of upstanding resilient spring clips 20–20' are provided which are carried by strap 10 on opposite sides thereof and are adapted to engage link 12' as illustrated and hold same therebetween against outward unlocking movement. As can be seen, the inwardly offset portions of the clips ride over the upper marginal edges of the ribs 12a' and 12b' and hold link 12' against movement. The locking links can be conveniently released by pulling outwardly thereon with a force sufficient to overcome the clip tension and spread the clips outwardly sufficiently to release link 12' therefrom. Such clip means or some equivalent means may be used to supplement the over-center locking action described, or may be used in place of the over-center action as the sole means of holding the handle structure in locked position. In the latter situation, the clamp would be similar in construction and operation to the one described, with the handle structure represented by links 11 and 12 operating to move the ends of strap 10 towards and away from each other for contracting and expanding the strap and opening and closing the clamp. However, the hinge Y might not pass outwardly of the centerline between hinges X and Z, or, even if it did, there might not be sufficient tension in the strap to provide an adequate over-center locking action, in either of which situations means such as clips 20-20' would be needed or desirable to hold the clamp in locked relationship with the tube.

It will, of course, be understood that various changes may be made in the form, details, arrangement and proportions of the various parts without departing from the scope of this invention.

What is claimed is:

1. The combination comprising a bag and a clamp, said clamp comprising an elongate flexible strap,
   a substantial rigid inwardly bowed first link having one end thereof hingedly connected to one end of said strap,
   a second substantially rigid link having one end portion thereof outwardly bowed and hingedly connected to the other end of said first link and the other end portion thereof forming an inwardly facing bend with the first portion hingedly connected to the other end of said strap,
   the hinge connection between said links being movable by articulation of said links between a first position on one side of a line extending through the axes of the hinge connections between said links and said strap in which first position said clamp is open, and a second position on the opposite side of said line in which second position said clamp is closed with the first mentioned hinge connection lying in said bend and held in such position by an over-center locking action,
   said first link underlying said second link and overlying a portion of said strap when the clamp is closed,
   said strap being tensioned when said clamp is closed and biasing the hinge connection between said first link and said strap outwardly,
   said clamp being attached to said bag so that the mouth of said bag assumes the shape of said clamp in each of said closed and open positions.

2. A clamp comprising an elongate flexible strap,
   a substantial rigid inwardly bowed first link having one end thereof hingedly connected to one end of said strap,
   a second substantially rigid link having one end portion thereof outwardly bowed and hingedly connected to the other end of said first link and the other end portion thereof forming with said first end portion an inwardly facing sharp bend forming an angular portion with the first portion hingedly connected to the other end of said strap,
   said one end portion being of a length substantially equal to the length of said first link,
   the hinge connection between said links being movable by articulation of said links between a first position on one side of a line extending through the axes of the hinge connections between said links and said strap in which first position said clamp is open, and a second position on the opposite side of said line in which second position said clamp is closed with the first mentioned hinge connection lying in said angular portion and held in such position by an over-center locking action,
   said first link underlying said second link and overlying a portion of said strap when the clamp is closed,
   said strap being tensioned when said clamp is closed and biasing the hinge connection between said first link and said strap outwardly.

3. The combination of claim 1, including a sleeve formed about the entire circumference of said bag and forming a part thereof, said clamp being installed in said sleeve and substantially completely enclosed thereby.

4. The combination of claim 1, wherein the mouth of said bag is hemmed, and wherein said clamp is incorporated in said hem.

5. The clamp of claim 2, wherein said second link has an upstanding rib formed thereon extending generally longitudinally thereof.

6. The clamp of claim 2, wherein one of said links is wider than said strap.

References Cited

UNITED STATES PATENTS

| | | | |
|---|---|---|---|
| 1,774,589 | 9/1930 | Broeske | 55—377 |
| 1,805,174 | 5/1931 | Gudka | 285—252 X |
| 1,970,041 | 8/1934 | Johnson | 24—71 X |
| 2,601,708 | 7/1952 | Pfisterer | 24—71 |
| 2,725,246 | 11/1955 | Weinhold | 285—252 |
| 2,846,244 | 8/1958 | Parker | 285—409 |
| 2,932,146 | 4/1960 | Campbell | 56—202 |

FOREIGN PATENTS

| | | |
|---|---|---|
| 511,344 | 5/1952 | Belgium. |
| 503,480 | 12/1954 | Italy. |
| 961,299 | 11/1949 | France. |

BERNARD A. GELAK, *Primary Examiner.*

JAMES L. JONES, JR., *Examiner.*